United States Patent Office 3,518,945
Patented July 7, 1970

3,518,945
TRANSFER APPARATUS
Melvin A. Raney, Cincinnati, Clifford L. Elmore, Loveland, Donald D. Brown, Cincinnati, and Richard C. Young, Lebanon, Ohio, and Harold H. Kruer, South Fort Mitchell, Ky., assignors to Precision Welder & Flexopress Corporation, Cincinnati, Ohio, a corporation of Ohio
Filed Feb. 28, 1968, Ser. No. 714,157
Int. Cl. E01b 26/00
U.S. Cl. 104—119                         10 Claims

ABSTRACT OF THE DISCLOSURE

An improved automatic transfer system for transporting workpieces between multiple stations at which manufacturing or assembling operations are performed upon the workpiece. The apparatus comprises a track over which single or multiple workpiece supporting pallets or cars are movable between stations. Each pallet is self-propelled by motor or motors which drive one or more friction drive wheels engaged with the track so that each pallet moves over the track whenever the movement of the pallet is unimpeded by other pallets or stops located on the track.

---

Generally, this invention relates to the field of automation and more particularly to an improved workpiece transfer apparatus especially adapted to transfer workpieces between stations at which successive manufacturing or assembling operations are performed upon the workpiece. A workpiece transfer apparatus of this general type is disclosed in U.S. Pat. No. 3,039,176 entitled "Automatic Work Performing Methods and Apparatus," filed June 19, 1962, and assigned to the General Electric Co.

That patent discloses a machine for manufacturing, processing, machinery testing and/or assembling workpieces at a plurality of automatic work performing stations, each station of which is capable of operating completely independently of and unsynchronized with other stations on successive workpieces. Each workpiece is presented sequentially to each station by individual unsynchronized transfer pallets in the form of powered cars movable along a track extending through the series of stations. The arrival of a powered car with a workpiece at a work station actuates the work performing cycle at this station. Each car with its workpiece is retained by the station during its operating cycle and thereafter is released for movement to a succeeding work performing station. The track which interconnects the various stations and over which the cars are movable between successive work stations is endless and include switches or stops operable to stop the self-powered car independently of one another at the successive stations.

In the diclosure of the patent, the track over which the self-propelled or self-powered cars are movable, is a single flat rail. The cars or pallets are movable relative to the rail as a consequence of rotation of a friction drive wheel moving over the surface of the flat rail. This drive wheel is driven by a conventional stall motor so that upon engagement of a car with a preceding car or with a stop at a work station, the motor will stall out and the car will rest until the trackway is cleared for further forward movement.

It has been a primary objective of this invention to improve upon the flexibility of the apparatus disclosed and described in the above identified patent. Specifically, the transfer apparatus of that patent is limited as a practical matter in the weight of the pallet which it can carry; consequently, it has been one objective of this invention to provide an improved pallet and trackway system which enables the apparatus to be utilized in the manufacture and assembly of heavier units than is practicable with the structure disclosed in that patent. To accomplish this objective, the invention of this application contemplates a rail which is generally C-shaped in cross section and has multiple roller supporting rails or surfaces located interiorly of the track. This arrangement enables the apparatus to be utilized in heavier duty applications for assembling heavier workpieces under more adverse environmental conditions.

To still further increase the flexibility of the system, this invention contemplates pallets which may be easily added to and removed from the system to accommodate differing shapes, sizes, and models of workpieces. The apparatus disclosed in the above identified patent is limited in that pallets or cars can only be added to the trackway at selected stations and only after sections of rail have been removed from the track. The invention of this application enables cars to be added to or subtracted from the system at any point along the track and without tampering in any way with the track. This is accomplished by mounting the rollers which support the cars upon a pivotable post which may be released by a detent type holding means and rotated to a position in which the rollers are disengaged from the guide rails so that the pallets or cars may then be slipped off of the track.

Another objective of this invention has been to increase the flexibility of the system by providing several parallel branch tracks and an improved automatic switching system for routing cars onto selected ones of the parallel tracks according to a predetermined schedule or program or upon demand to parallel duplicate operations to increase production and balance cycle time.

Another objective of this invention has been to expand the environmental conditions under which this transfer system is usable. This objective has been accomplished by enclosing the trackway along which the pallets move and forcing a constant flow of air through the enclosed trackway. The primary advantage of this air flow is that it forces dirt and debris out of the trackway system and prevents it from entering so that the system may be used in relatively "dirty" environments. Additionally, this air flow cools the drive motors and bearings and thus enables the system to be used in relatively high temperature environmental conditions, as for example in low temperature ovens.

Another objective of this invention has been to increase the flexibility of the system by enabling the pallets to change speed as the pallets move through the system. This objective has been very simply accomplished without the necessity for change speed gearing or variable speed motors by providing multiple different diameter friction drive wheels on the output shaft of the drive motor. By simply changing the one of the wheels which is engaged with the drive surface of the track, the speed at which a car moves relative to the track may be varied in accordance with a predetermined program.

Because the stations of this system are all operated independently and are unsynchronized, there is nothing to insure that a predetermined quantity of work is accomplished in a predetermined unit of time. While this feature is desirable from the standpoint of flexibility, it can be a disadvantage in the case of a manually operated station where there is nothing to control the rate at which the operator works. Accordingly it has been another objective of the invention to provide a pacer station in the system operable to move pallets through the station at a rate which cannot be controlled by an operator at the station. To accomplish this objective, an auxiliary drive is superimposed upon the stall motor drive of the cars. This auxiliary drive is a positive drive which picks up a car upon its entering into the pacer station and releases it only at the exit end so that it passes through the station at a predetermined and fixed speed.

Another aspect of this invention which lends itself to the increased flexibility of the system is the utilization of multiple drive motors upon each individual car. This construction facilitates modular construction of the system by enabling lesser or greater numbers of drive motors to be utilized depending upon the load which the pallet is designed to carry. This construction also has the advantage of minimizing the transverse cross section of the cars required to accommodate a predetermined horsepower drive source.

These and other objectives and advantages of this invention will be more readily apparent from the following description of the drawings in which:

FIG. 1A is a top plan view of one switching station of the system of FIG. 1 but in an alternate position from that illustrated in FIG. 1.

Figure 1:
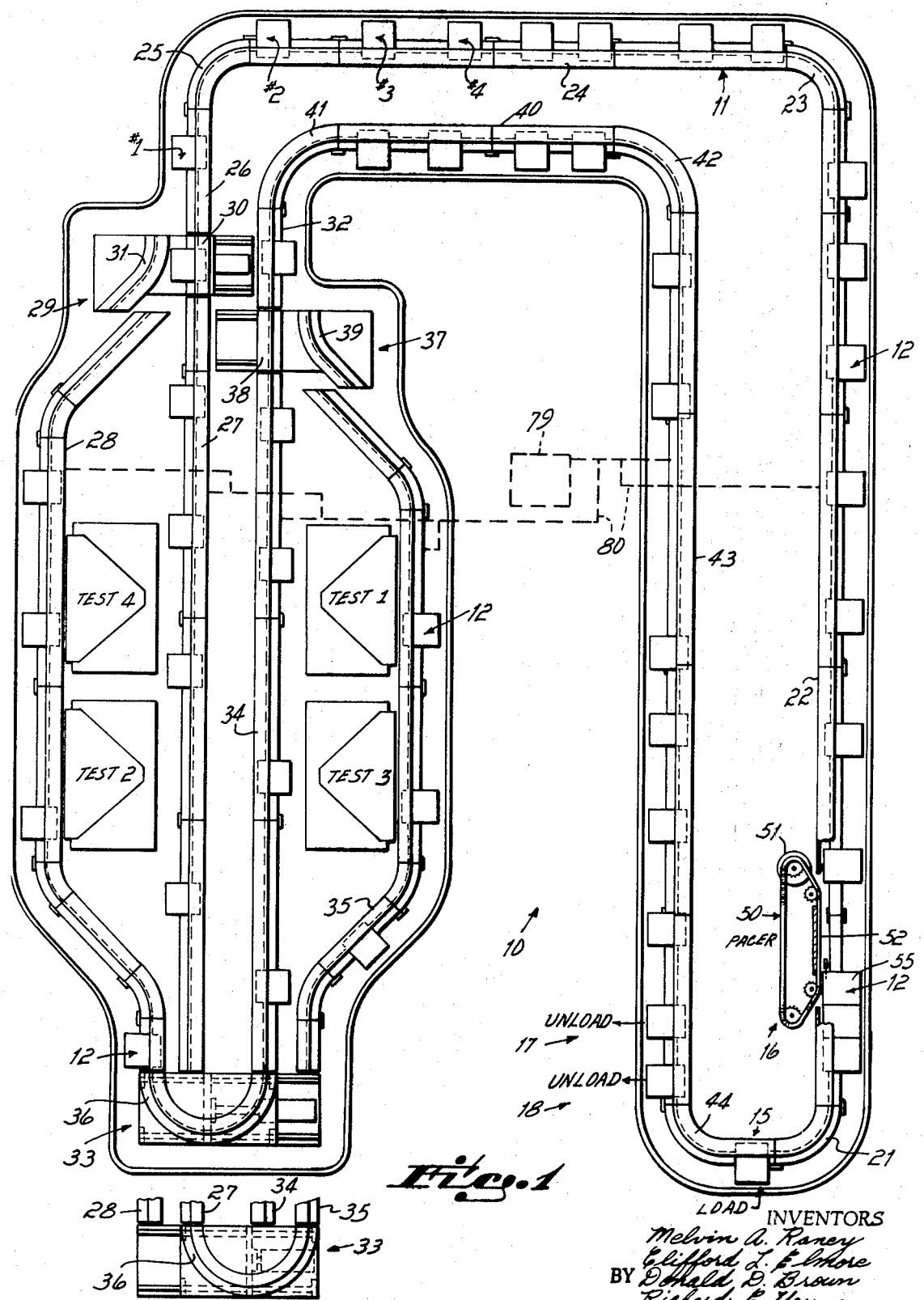
FIG. 1 is a top plan view of a transfer system incorporating the invention of this application.

Referring first to FIG. 1, there is illustrated one preferred embodiment of a transfer system 10 according to the present invention. This system comprises a generally U-shaped endless track 11 having parallel branches in one leg of the U. Multiple work stations for performing successive work operations on workpieces (not shown) clamped or secured by jigs or fixtures to the top of the pallets or cars 12 are located along the track. For purposes of this description, only the load station 15, a pacer station 16, and four test stands or stations 1T, 2T, 3T, and 4T, as well as a pair of unloading stations 17 and 18 have been illustrated and described in detail herein. There could be as many successive work stations located along the remainder of the track as required for the manufacture or assembly of a workpiece.

Starting at the load station 15, the network of track comprises a first 90 degree turn section 21, a long straight section of track 22, a right angle turn section 23, and a second straight section 24. Another right angle turn section 25 joins the straight section 24 to a short straight section 26 which in turn branches into a pair of parallel sections 27, 28 of track at a switching station 29. The switching station 29 comprises a movable carrier and two differently configurated sections of track mounted upon the carrier which alternately connect the section 26 of track to either one of the two sections of track 27 and 28, depending upon which section 30, 31 of track of the transfer station 29 is aligned with the straight section 26. Another transfer station 33 is located at the end of the two branches 27, 28 of track and is operable to alternately connect the section 28 to a straight branch section 34 and the section 27 to a branch 35 which parallels the section 34. The transfer station 33 comprises a single semi-circular shaped section 36 of track mounted upon a movable carrier and operable to connect the section 28 of track to the section 34 as illustrated in FIG. 1 or the section 27 to the section 35 as illustrated in FIG. 1A. The sections 34 and 35 of track are alternately connected to a straight section 32 by a switching station 37. This latter station 37 is identical to the station 29 and has two sections of track 38, 39 mounted upon a carrier and operable to interconnect the section 34 to the section 32 and the section 35 to the section 32 alternately. The section 32 is in turn connected to a straight section 40 by a curved section 41. A curved section of track 42 interconnects the straight section 40 to a straight section 43 leading to the unload stations 17 and 18. From the unload stations, the empty pallets pass through a 90 degree turn section 44 back to the load station 15.

The switches shown operate between branch tracks which are in the same horizontal plane, but it will be apparent that switches can be used to transfer cars between vertically spaced branch tracks.

The purpose in dividing the single track section 26 into multiple flow paths at the switching station 29 is to form the single column of cars into plural columns so that relatively slow operations may be performed both in parallel and in series rather han in series only only. Once divided into two branches, the workpieces on the pallets are tested in series at two test stations 2T and 4T in the branch 28 and in two test stations 1T and 3T in the branch 35. Thus a car designated as #1 may pass through the switching station 29 onto the track 27, through the switching station 36 onto the track 35, past a withdrawn or retracted stop at the test station 3T, to the test station 1T. The stop at the test station 3T may have a counter upon it which stops every other car so that it permits one car to move to the station 1T and then stops the next following car.

The next car #2 following car #1 is then routed from the section 26 of track via the section of track 31 on the switch 29, onto the branch 28. Car #2 then moves over the branch 28 through test station 4T to test station 2T at which it is stopped. Switching station 29 then routes the next car #3 over the sections of track designated as number 30, number 27, number 36, onto the branch 35 where the car is stopped at test station 3T. The next following car is routed onto the section of track 28 by the switch 29 and is stopped at test station 4T. The next following car is then routed onto the section of track 27 and the cycle is repeated.

As an alternative to this programming, the switch 29 may be programmed to pass cars #1 and #2 to the test stations 2T and 4T and then to pass the next two cars #3 and #4 to the test stations 1T and 3T. In other words, counters associated with the stops or switching circuits associated with the stops may be programmed to pass two or more cars before routing the following cars over the other section of track 30 or 31 at the switch station 29. Thus, workpieces on four pallets 12 would be simultaneously tested at the four test stands 1T through 4T.

The pacer station 16 is generally a station at which a manual operation is performed upon a workpiece mounted or seated upon the top platform 55 of a pallet 12. The mounting of the workpiece has not been illustrated in the drawings, but could consist of a conventional jig or fixture for securing one or more workpieces in a predetermined orientation and position upon the top of the pallet. Since each pallet is self-propelled and is not dependent upon any other pallet in the system to determine the rate at which it progresses through a work station, it is possible for a slow manual operator to set his own pace at a rate which may be substantially less than optimal. Accordingly, it may be desirable to pace a workpiece past a station or an operator in the system so as to assure that a selected number of workpieces pass through the system in a unit of work time.

As is explained more fully hereinafter, drive to the individual pallets 12 is provided by one or more stall motors 115, 116 operable to drive a friction wheel 70, 71 engaged with a stationary rail 60 of the track 11 so as to propel the pallets relative to the track 11. The pacer station 16 overcomes the friction drive and operates to move the pallets through the pacer station 16 at a predetermined fixed rate. To this end, the pacer station comprises an endless belt or a chain 50 mounted beside the straight section of track 22 and driven by a constant speed motor 51. One stretch 52 of the chain extends and runs parallel to the section 22 of track. Lugs 53 extend outwardly from the chain 50 and engage recesses of protrusions 49 on the pallets 12 so as to force the pallets through the station 16 at the rate of movement of the lugs 53. A conventional stop (not shown) may be used to hold the pallets in a position to be engaged by the lugs of the chain preparatory to movement through the pacer station.

Figure 5:
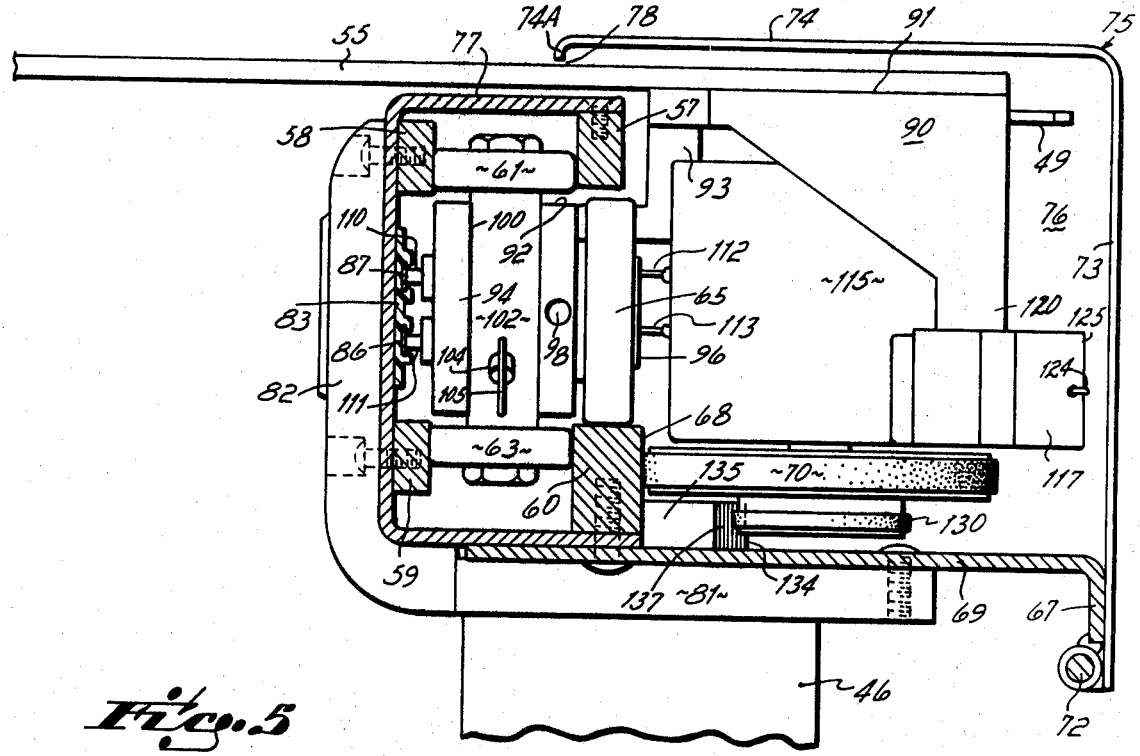
FIG. 5 is a transverse cross sectional view through a portion of the track taken on line 5—5 of FIG. 4.

Referring now to FIG. 5, it will be seen that the track 11 is generally C-shaped in cross section and has four guide rails secured to the inside of the generally C-shaped configuration. The two uppermost ones 57, 58 of the guide rails are bolted to the track 11 in spaced relation so as to form between them a trackway for a pair of upper rollers 61, 62 of the pallets. Similarly, two lower rails 59 and 60 are bolted to the track and form a trackway for a pair of lower rollers 63, 64 of the pallets. (Alternatively, a laminated construction or a one-piece construction for the track and rail surfaces thereon can be used.) The top surface of the lower inside rail 60 of the track serves as a supporting surface for two freely rotatable support rollers 65, 66 of the pallets, while the rear surface 68 of the rail 60 functions as the friction drive surface against which the friction drive rollers 70, 71 rotate during movement of the pallets relative to the rail.

As may be seen most clearly in FIGS. 1 and 5, the track 11 is sectionalized, or built in modular panels. Consequently, the sections may be combined in much the same manner as model train railroad tracks are combined to form numerous differently configured tracks for different applications and for use in differently configurated areas.

Each section has a lower platform 69 which extends longitudinally for the full length of the section. At the rear, each platform 69 terminates in a depending flange 67 having a pin hinge 72 along its lower edge. This hinge is pinned to a cover 75 which is generally L-shaped in cross section and has one vertical leg 73 extending upwardly from the hinge 72 and a horizontal leg 74 at the top which extends forwardly over the track 11. Consequently, each section of track cooperates with the attached cover to form a longitudinal cavity or trackway 76 through which the individual pallets pass in moving over the track.

As explained more fully hereinafter, the forward end 74A of the cover 75 is spaced from the top surface 77 of the track 11 so that a slot 78 is defined between the cover and the track. As may be seen most clearly in FIG. 5, the platform section 55 of each pallet 12 extends forwardly through this slot 78 and is adapted to support jigs or fixtures clamped or secured to the top surface of the platform outside the trackway.

In some applications, it is desirable to maintain the enclosed trackway defined between the cover 75 and the track 11 under pressure greater than atmospheric pressure. This air pressure results in a stream of air being emitted through the slot 78 between the edge 74A of the cover 75 and the top 77 of the track so that dirt and debris are blown out of the track and prevented from entering through the slot. A secondary advantage of this air flow is that it has a cooling effect upon the pallet drive motors and supporting bearings and thus enables the system to be utilized in high temperature environments as, for example, in bake-out ovens, etc.

Air pressure to the trackway may be supplied from a conventional compresser and blower 79 through a network of conduits 80, or from a series of blowers or fans. Since the compresser and conduits are conventional commercially available equipment, these elements have only been illustrated diagrammatically in FIG. 1.

Figure 6:
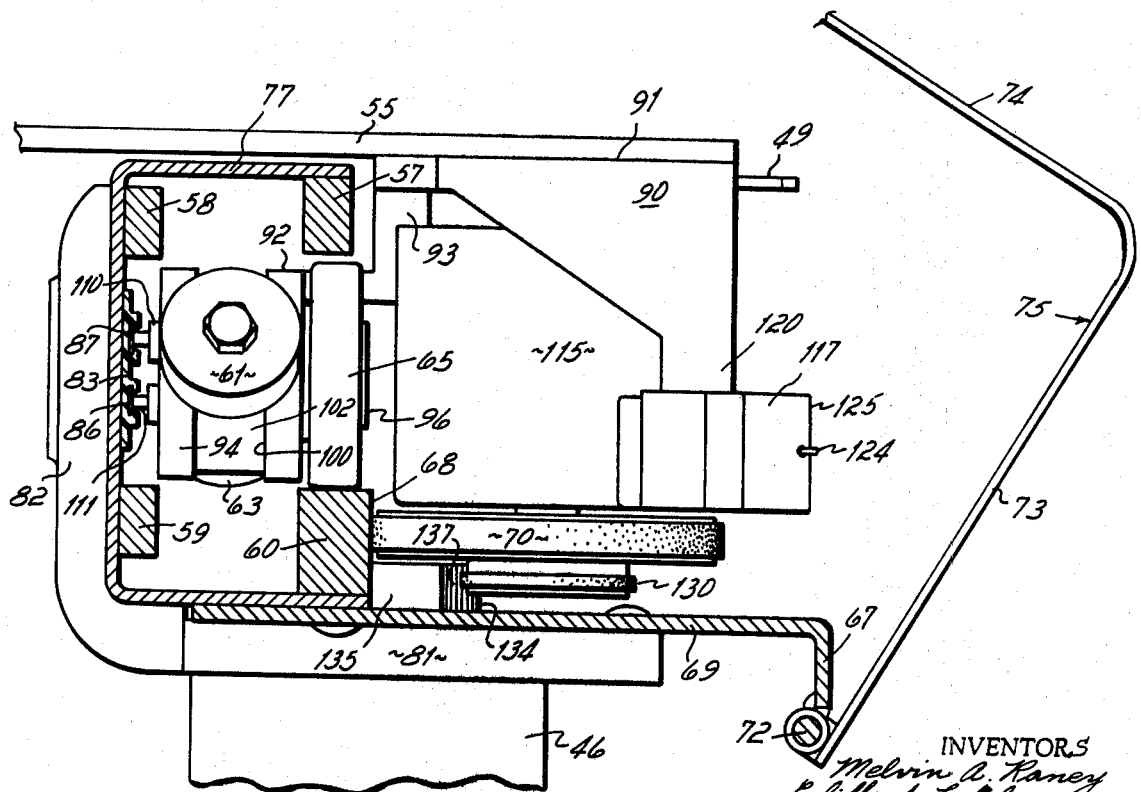
FIG. 6 is a view similar to FIG. 5, but illustrating the position of the pallet guide rollers preparatory to removal of a pallet from the track.

As may be seen most clearly in FIG. 6, the pin hinges 72 enable the cover 75 to be pivoted in a counterclockwise direction to expose the interior of the trackway and facilitate access to pallets located within the trackway The individual sections of track are joined together and are supported by vertical stanchions or vertical legs 46. These stanchions each have horizontal platforms 81 at their upper end to which the bottom shelf 69 of each section of track is secured. A vertical leg 82 of each stanchion is bolted to the vertical portions of each section of track 11 adjacent the ends of the sections. Thus, the stanchions 46 not only support the track but also interconnect the longitudinal ends of each track section.

As may be seen most clearly in FIGS. 5 and 6, the inner vertical wall of each section of track has an insulated strip 83 secured thereto. Fitted within vertically spaced longitudinal slots of this strip are two flat electrical conductors 86, 87. At the end of each section of track, conventional junction plates (not shown) such as illustrated in Pat. No. 3,039,176 join abutting end sections of conductive strips.

Figure 2:
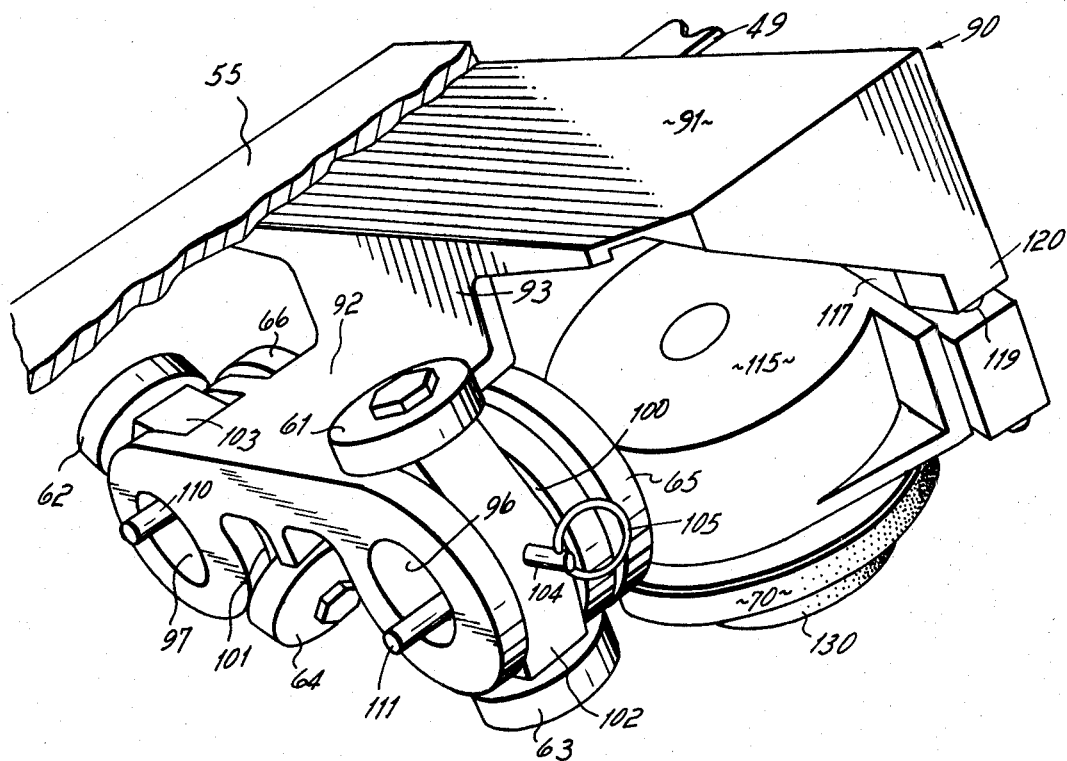
FIG. 2 is a perspective view, partially broken away, of a pallet or car utilized in the transfer system of FIG. 1.

Referring now particularly to FIG. 2, there is illustrated one preferred embodiment of a self-propelled pallet or car to be utilized in the transfer system of this invention. This pallet 12 comprises a main body casting 90 having a rear horizontal platform 91 and a lower front horizontal platform 92 interconnected by a vertical leg 93. Longitudinally split journal blocks 94, 95 depend from the front platform 92. Each of these journal blocks 94, 95 supports a main shaft 96 and 97 upon which support rollers 65, 66 are rotatably journalled. To prevent the shafts 96, 97 from rotating relative to the journal blocks 94, 95, set screws 98 extend radially through the blocks into engagement with the periphery of the shafts 96, 97.

Mounted within each vertical slot 100, 101 of the journal blocks 94, 95 is a roller support block 102, 103. Each block 102, 103 is rotatably journalled upon one of the shafts 96, 97. A detent type of locking pin 104 having a finger ring 105 at its outer end extends through each block 102, 103 and is engageable with a diametral slot 106 of the shaft 96 or 97 to lock one of the pivot blocks 102, 103 against rotation relative to the shaft 96, 97 upon which it is mounted. When the finger rings 105 are pulled outwardly away from the pivot blocks 102, 103, the pins 104 disengage from the shafts so that the pivot blocks may then be rotated through approximately 45 degrees to the position illustrated in phantom in FIG. 4. As explained more fully hereinafter, with the pivot blocks in the latter position, the pallets are free to be moved rearwardly and removed from the track.

The guide rollers 61, 63 and 62, 64 are rotatably secured to the opposite ends of the pivot blocks 102, 103, respectively. The uppermost ones 61, 62 of these rollers are movable within the trackway defined between the two upper guide rails 57, 58 of the track 11 and the lower rollers 63, 64 are similarly rotatable within the trackway defined between the two lowermost rails 59 and 60. As may be most clearly seen in FIG. 5, release of the support blocks 102, 103 from a locked position by movement of the detent pins 104 outwardly to a position out of engagement with the supporting shafts 96, 97 enables the blocks to be rotated through 45 degrees to the position illustrated in phantom in FIG. 4 in which the rollers are disengaged from the guide rail. With the rollers thus disengaged, the pallet is free to be moved rearwardly relative to the track and removed therefrom.

Figure 4:
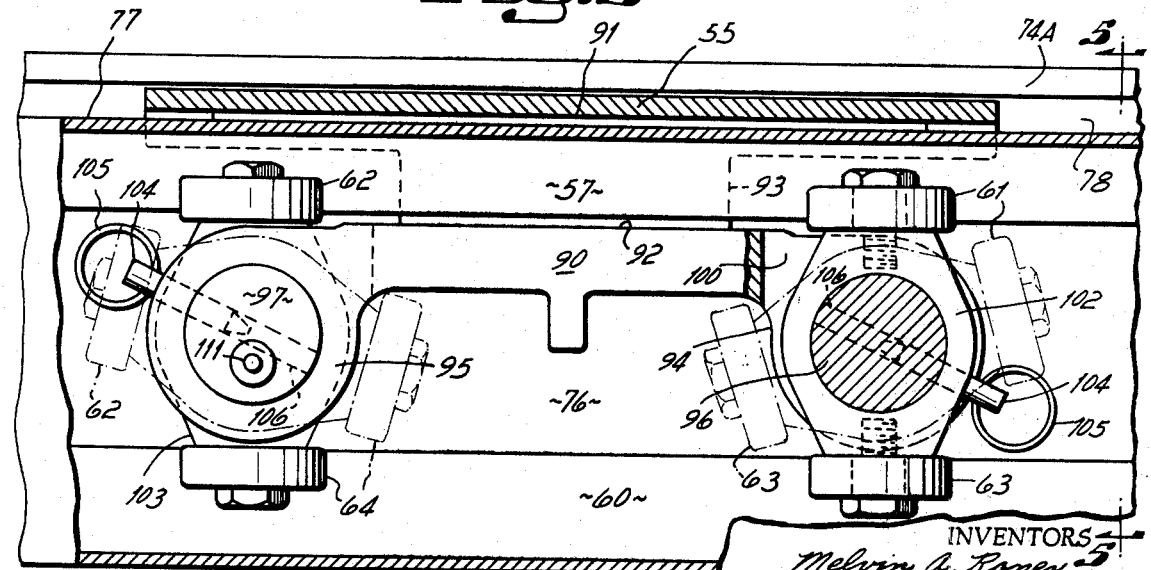
FIG. 4 is a cross sectional view through a pallet and section of track taken along line 4—4 of FIG. 3.

As may be seen most clearly in FIGS. 2 and 4, the electrical contact brushes 110, 111 are telescopically mounted within each of the shafts 96, 97 respectively. The brush 110 is mounted in the vertical plane of the center line of the rollers 61, 63 and the brush 111 is similarly mounted in the vertical plane of the rollers 62, 64. This location of the brushes minimizes the telescoping movement required by the brushes 110, 111 to maintain contact with the electrical conductors 86, 87 as the pallets travel around an arcuate section of track. Since the distance between the center line of each pair of rollers 61, 63, and 62, 64 and the track remains constant throughout movement of the pallet relative to arcuate sections of track, no telescopic movement of the brushes is required to maintain contact with the electrical conductors. To insure against the loss of contact which could result from manufacturing imperfections, wear, etc., the brushes are preferably spring biased outwardly in a conventional manner.

In the preferred embodiment, two drive motors are utilized to move each pallet relative to the track 11. This utilization of dual drive motors has the advantage of facilitating modular construction and minimizing the space requirements for a preselected horsepower drive unit. In applications where relatively small and light workpieces are to be manufactured or assembled upon the pallet, a single drive motor may be utilized but if greater power is required, a second drive motor may be utilized.

Figure 3:
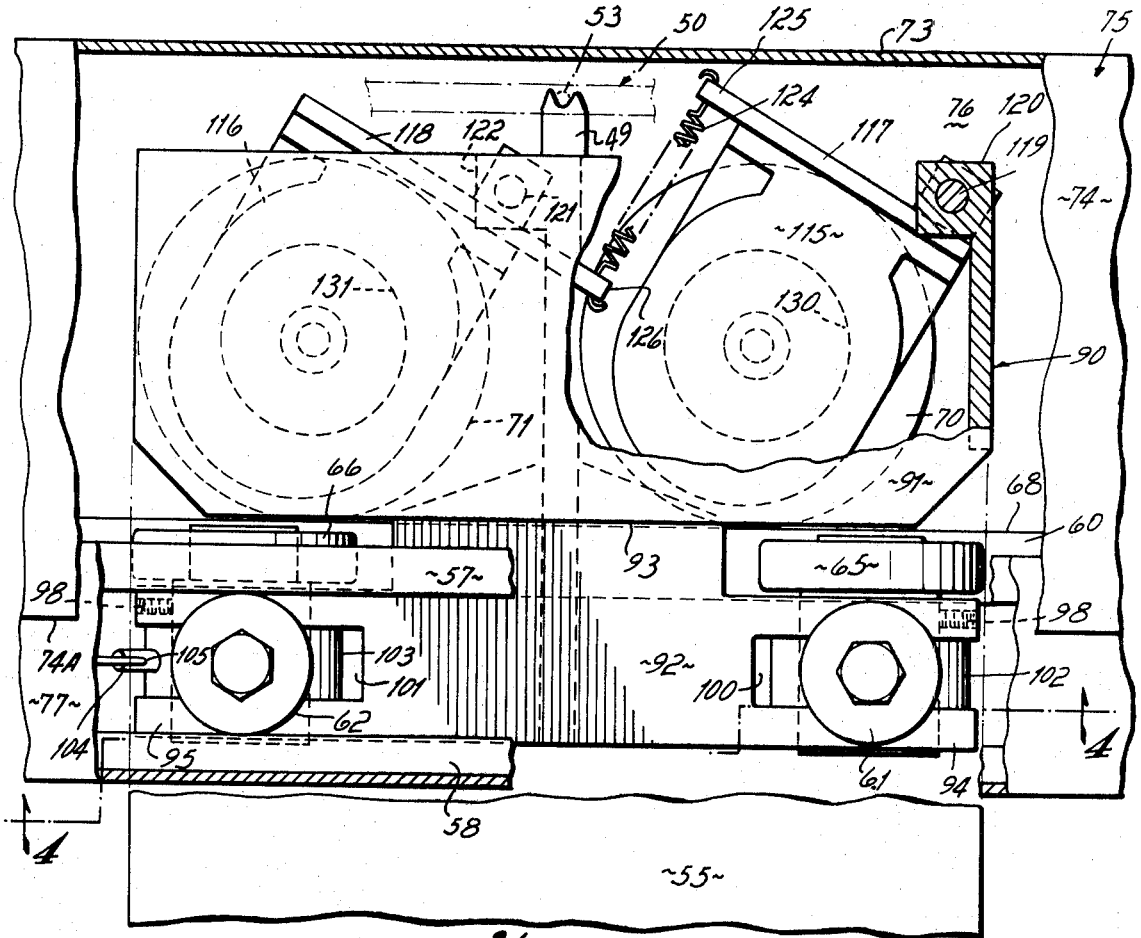
FIG. 3 is a top plan view, partially broken away, of a pallet and a portion of the track of FIG. 1.

As may be seen most clearly in FIGS. 2 and 3, the dual drive motors 115, 116 are fixedly secured to a pair of plates 117, 118, respectively. Plate 117 is pivotally secured by a vertical pin 119 to a depending vertical leg 120 of the main body casting 90 of the pallet at a point adjacent to one end of the plate. Plate 118 is similarly pivotally secured by a vertical pin 121 to a depending flange 122 of the body casting but at a point located medially of the ends of the plate 118. A tension spring 124 interconnects the forward end 125 of the plate 117 and the rearward end 126 of the plate 118 so that the spring tends to force the center lines of both motors 115, 116 in a counterclockwise direction (as viewed in FIG. 3) about the pivot pins 119 and 121, respectively. In moving counterclockwise about these pivots, the center lines of both motors 115, 116 are moved toward the drive surface 68 of the supporting rail 60 of the track. Consequently, the friction drive wheels 70, 71 attached to the output shafts of the motors 115, 116 are both forced into engagement with the drive surface 68 of the rail 60 with approximately the same force. The drive wheels 70 and 71 are advantageously made of polyurethane.

To enable the rate of movement of the pallets to be altered or varied at selected stations located along the track 11, a second smaller diameter drive wheel 130, 131 is preferably secured to the lower end of each of the output shafts of the motors 115, 116. Since the smaller diameter wheel has a slower peripheral speed than the larger diameter wheel 70, 71 on the same motor output shaft, the speed of the pallet past the selected station may be varied by moving the larger diameter drive wheel 70 out of engagement with the drive surface 68 of the rail 60 while simultaneously moving the periphery of the smaller drive wheel 130 into engagement with a vertical drive surface 134 of an auxiliary drive rail 135 located at the station at which the motion of the pallet is to be slowed. This movement of the larger drive wheel 70 out of engagement with the drive surface 68 and movement of the periphery of the drive wheel 130 into engagement with the surface 134 may be accomplished by moving the lower drive wheel 130 up a ramp or inclined surface 137 of the rail 135 until the axis of the output shaft of the motor has moved away from the drive rail 60 a sufficient distance to disengage the periphery of the wheel 70 from the surface 68 of the drive rail. Thereafter, the periphery of the smaller drive wheel 130 remains in engagement with the vertical surface 134 of the auxiliary drive rail 135 as the pallet moves slowly past the station at which the movement is to be slowed. As the pallet moves off of the auxiliary rail 135, the spring 124 moves the axis of the output shaft of the motor back toward the drive rail 60 and re-engages the peripheral surface 70 of the larger diameter drive wheel with the vertical surface 68 of the drive rail, thereby speeding up the movement of the pallet relative to the rail.

In operation, the upper drive rollers 61, 62 of these pallets are located within the trackway defined between the two guide rails 57, 58 of the track, while the lower guide rollers 63, 64 are located in the trackway defined between the two lower guide rails 59 and 60. These guide rollers thus hold the pallets against lateral movement relative to the track.

The pallets are supported upon the top surface 67 of the guide rail 60 by the support rollers 65, 66. Power is supplied to the drive motors 115, 116 of the pallet from the electrical conductors 86, 87 attached to the track to the contact brushes 110, 111 through electrical leads 112, 113. This electrical power drives the two stall motors so long as the movement of the pallet is unimpeded by stops or other pallets.

If a pallet encounters another pallet in its path of movement, the electrical stall motors 115, 116 cease to rotate and wait for the path to be cleared. In this way, banks or reservoirs of workpieces and pallets may be maintained at each work station.

Since prolonged stalling of the motors causes heating, it is desirable in some instances to provide a switch in the motor circuit on each pallet, positioned to be opened when the pallet is stopped by the pallet ahead of it, or is otherwise arrested This deenergizes the motor and prevents unnecessary heating caused by stalling; moreover, it avoids the accumulating force on the lead pallet of stalled pallets behind it. In this connection, it may also be useful to "tune" or adjust the voltage applied to the track leads 112 and 113 to a value somewhat less than the voltage at which the motors are in fact designed to operate. While this reduces rate of pallet travel, it can very significantly reduce heating of stalled motors. For example, it has been found that motors designed for running at 120 volts operate well enough, and with much less heating when stalled, at 93 volts.

Whenever the rate of movement of a pallet through a work station is to be slowed to a speed less than the normal operating speed, an auxiliary drive rail 135 is secured to the track 11 at the station. Upon arrival of each pallet at this station, the smaller diameter auxiliary drive wheels 130, 131 engage and ride up an inclined ramp 137 of the rail 135 onto the vertical surface 134. As the smaller diameter wheels 130, 131 move up the ramp 137 they cause the larger diameter wheels 70, 71 to be disengaged from the vertical surface 68 of the drive rail 60 as a consequenc of pivotal movement of the motors 115, 116 about the pivot pins 119, 121, respectively. When the smaller diameter drive wheels 130, 131 move off of the auxiliary drive rail 135 the main drive wheels 70, 71 move back into engagement with the drive rail 60 as a consequence of the spring 124 biasing the motors in a counterclockwise direction as viewed in FIG. 3.

Alternatively the rate of travel of a pallet over a section of track can be changed by applying a different voltage to the electrical leads 112, 113 over that track section; lower voltage will reduce the rate of car travel. Such a switch can also be used to actuate a conventional dynamic braking circuit of the pallet motors.

Pallets may be added to or subtracted from the track 11 by releasing the locking pins 104 from engagement with the supporting shafts 96, 97 and rotating the roller support blocks 102, 103 through approximately 45 degrees. This is accomplished very conveniently by simply pulling the pins outwardly. The guide roller support blocks 102, 103 may then be rotated to the position illustrated in phantom in FIG. 4. With the rollers in this position, and the cover 75 pivoted to a position in which it hangs downwardly from the hinge pins 72, the pallets may be moved rearwardly out of engagement with the track 12. Alternately, other pallets may be added to this system while their guide rollers are in the position illustrated in phantom in FIG. 4. Thereafter, the pallets may be locked onto the rail by pivoting the guide blocks 102, 103 into the position illustrated in solid lines in FIG. 4 and locking the blocks in this position by means of the lock pins 104.

It is apparent that the construction described "captures" the pallet, so that it cannot be removed from the track unless the guide blocks are swung to release position. This is especially advantageous where heavy off-center or overhanging loads are to be carried, and it also permits the pallets to be used even in inverted or upside-down position.

In the interest of clarity and brevity, the electrical control circuit as well as the stop mechanisms for programming the sequence of movements of the pallets through the trackway system of FIG. 1 have not been illustrated and described herein. Controls of this type are conventional in this art and are illustrated in numerous issued patents, as for example, the above identified General Electric Company patent.

While only a single preferred embodiment of our invention has been illustrated and described herein, those persons skilled in the arts to which this invention pertains will readily appreciate numerous changes and modifications which may be made without departing from the spirit of our invention.

Having described our invention we claim:

1. In combination, a track and a workpiece support pallet movable along said track, said pallet having a drive motor mounted upon it and two different diameter drive wheels driven by said drive motor, said two wheels being alternately engageable with two drive rail means on said track, one of said wheels ordinarily engaging one of said two drive rail means, the second drive rail means projecting a different distance from said track than the first to engage the second wheel while the first wheel is disengaged from the first track, so that rotation of said wheels effects movement of said pallet along said track at a rate determined by the one of said two wheels which is engaged with said drive rail means.

2. The combination of claim 1 wherein said drive wheels are friction drive wheels operable to frictionally drive said pallet over said drive rail means, said wheels being spring biased into frictional driving engagement with said drive rail means.

3. In combination, a track and a workpiece support pallet movable along said track, said track being C-shaped in cross-section and comprising a channel having spaced generally horizontal upper and lower limbs connected by a vertical wall portion, two horizontally spaced upper rails provided interiorly on said channel below said upper limb and two horizontally spaced lower rails provided interiorly on said channel above said lower limb, said pallet comprising a body mounting at least one upper guide roller movable over and confined against lateral disalignment between the two upper guide rails, said body also mounting at least one lower guide roller movable over and confined against lateral disalignment between the two lower guide rails, at least one pallet supporting roller rotatable about a horizontal axis and movable over a supporting guide rail, motor drive means connected to drive a propulsion wheel on said pallet to move said pallet along said track, said drive means mounted to said body opposite said vertical wall portion of the track, and a workpiece receiving platform mounted to said body.

4. The combination of claim 3 further wherein said motor drive means is a torque motor and said propulsion wheel engages a vertical surface on one of said guide rails.

5. The combination of claim 3 wherein said upper guide roller and said lower roller are mounted upon a support block which is pivotable about a horizontal axis so as to enable said rollers to be disengaged from confinement between said rails, said pallet being removable from said track by moving said rollers through the open portion of said C-shaped track when said rollers are disengaged from confinement between said rails.

6. The combination of claim 3 wherein said motor drive means comprises at least one drive motor mounted upon said pallet and a propulsion wheel driven in rotation about a vertical axis in driving engagement with a vertical surface provided on one of said lower rails so that rotation of said wheel effects movement of said pallet along said track.

7. The combination of claim 3 wherein said motor drive means comprises at least one drive motor mounted upon said pallet and two different diameter drive wheels driven by each of said drive motors, said two wheels being selectively engageable with alternate drive rail means on said track so that rotation of said wheels effects movement of said pallet along said track at a rate determined by the one of said two wheels which is engaged with said drive rail means.

8. The combination of claim 3 further wherein said track has a cover secured thereto, said track and said cover cooperate to define an enclosed longitudinal trackway having a longitudinal air flow restricting slot defined therein, said pallet being movable within said enclosed trackway, said pallet having a platform extending through said slot outwardly of said trackway, said platform outside said trackway being adapted to receive and support a workpiece.

9. The combination of claim 8 which further includes means for supplying air under pressure greater than atmospheric pressure to said enclosed longitudinal trackway so that chips and debris are blown out of said trackway by the pressurized air.

10. The combination of claim 8 wherein one longitudinal side of said slot is defined by a portion of said cover and the other longitudinal side of said slot is defined by a portion of said track.

References Cited

UNITED STATES PATENTS

| 491,151 | 2/1893 | Werner | 104—91 |
| 1,801,141 | 4/1931 | Connors | 104—119 X |
| 3,039,176 | 6/1962 | Deschenes et al. | 104—88 X |
| 3,099,097 | 7/1963 | Simmons | 104—279 X |
| 3,179,064 | 4/1965 | Dehne | 104—172 |
| 3,183,851 | 5/1965 | Hawks | 104—91 |
| 3,254,608 | 6/1966 | Alden | 104—247 X |

GEORGE E. A. HALVASO, Primary Examiner

U.S. Cl. X.R.

104—93, 108, 152, 247